(No Model.)

J. J. MALONE.
TOBACCO HILLER AND FERTILIZER DISTRIBUTER.

No. 540,175. Patented May 28, 1895.

Witnesses
Wm. A. Schoenborn
John M. Diggers

Inventor
John J. Malone
By his Attorneys,
C. A. Snow & Co.

UNITED STATES PATENT OFFICE.

JOHN J. MALONE, OF WASHINGTON, KENTUCKY.

TOBACCO-HILLER AND FERTILIZER-DISTRIBUTER.

SPECIFICATION forming part of Letters Patent No. 540,175, dated May 28, 1895.

Application filed July 27, 1892. Renewed November 10, 1894. Serial No. 528,429. (No model.)

*To all whom it may concern:*

Be it known that I, JOHN J. MALONE, a citizen of the United States, residing at Washington, in the county of Mason and State of Kentucky, have invented a new and useful Tobacco-Hiller and Fertilizer-Distributer, of which the following is a specification.

My invention relates to improvements in machines for hilling tobacco; and the objects in view are to provide such a machine, and to so construct the same as, in addition to hilling the ridge or furrow, to open and drill therein fertilizer, and subsequently close the furrow, all in one continuous operation.

Other objects and advantages of the invention will appear in the following description, and the novel features thereof will be particularly pointed out in the claims.

Figure 1:
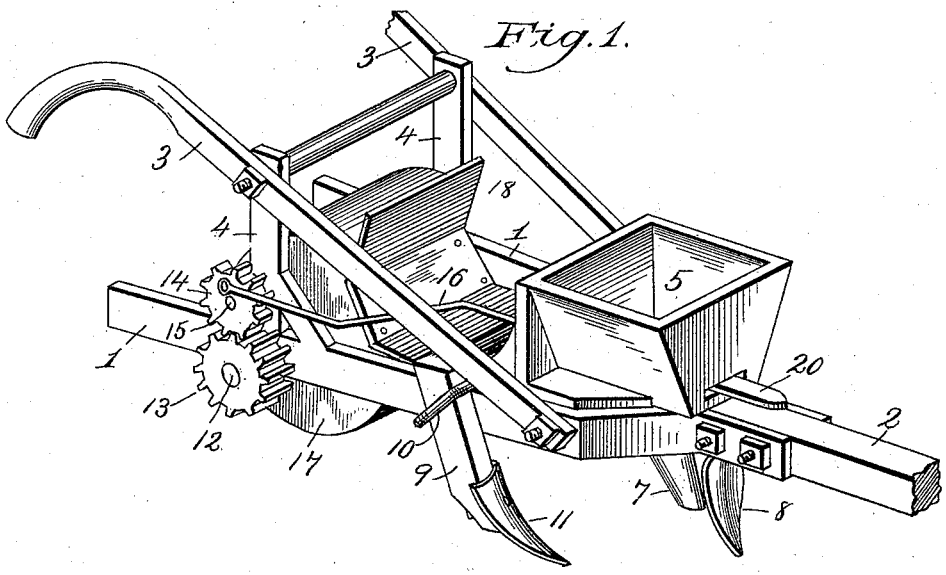
Figure 2:
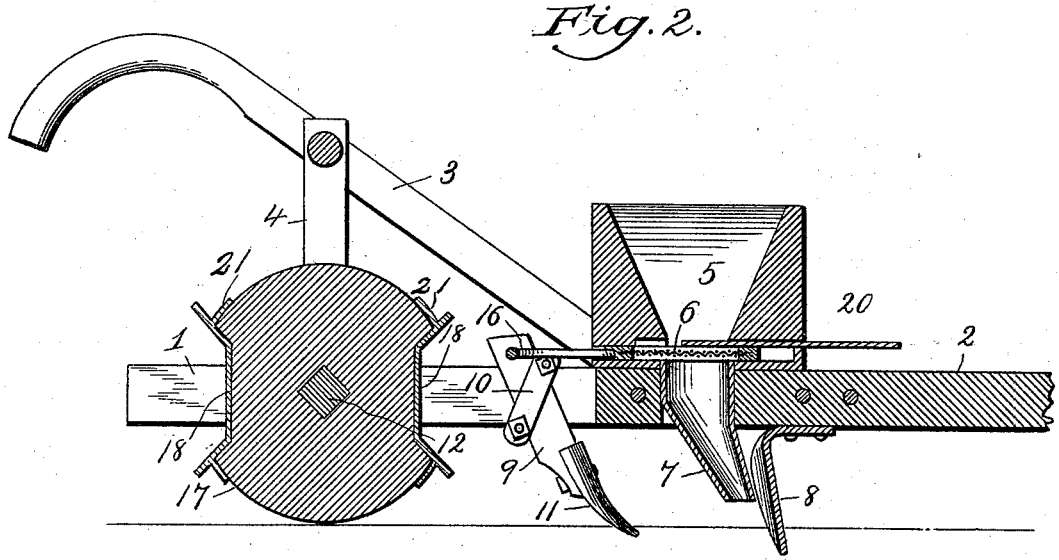

Referring to the drawings, Figure 1 is a perspective view of a machine embodying my invention. Fig. 2 is a vertical longitudinal section of the same.

Like numerals of reference indicate like parts in both figures of the drawings.

In practicing my invention, I employ a pair of opposite side-beams 1, the front ends of which are converged, clamp, and are bolted to a draft pole or beam 2. A pair of handles 3 are connected at their lower ends to the side-beams, and are supported near their rear ends by a pair of standards 4 rising from the beams 1. A hopper 5 is supported upon the beams or side-bars 1, near their front ends, and is provided with converging walls which terminate in an opening. In ways mounted in the bottom of the hopper below the opening, a reticulated screen 6 is located for reciprocation, and below the same there is secured to the side-bars a discharge-tube 7, in front of which is located a furrow-opening shovel 8. To the opposite side-beams standards 9 are clipped, at 10, just in rear of the hopper, said standards being inclined and provided with furrow-closing shovels 11.

An axle 12 is journaled in the opposite side-beams 1, and the same at one end is provided with a spur-pinion or gear 13, which engages with a smaller similar pinion 14, mounted on a stub-shaft 15, extending from the adjacent handle-supporting standard 4. A bent pitman 16 is loosely connected at its front end to the reticulated screen of the hopper, and at its rear end connected eccentrically with the pinion 14, so that the rotations of the latter will cause a reciprocation of the pitman and of the screen.

Between the beams 1 there is mounted on the shaft or axle 12 a roller 17, and said roller is provided at diametrically opposite sides with depressions or recesses 18.

The operation of the machine may be stated as follows: Fertilizer is placed in the hopper 5, and the outflow of the same is regulated through a slide 20, which is located in the bottom of the hopper above the screen. As the machine travels along the axle is rotated through the medium of the roller and the motion of the axle is transferred through the gears and pitman to the sliding reticulated screen, which causes the fertilizer to sift therethrough and be discharged from the discharge-tube 7. The discharge-tube 7 deposits the fertilizer into the furrow formed by the furrow-opening shovel 8, and after a deposit of the fertilizer in the furrow thus formed, the covering shovels return the soil removed from the furrow, to the furrow, thus forming the ridge in which the fertilizer is distributed. At its rounded portions the roller compresses or packs the dirt forming the ridge, while those portions of the ridge into contact with which the recesses of the roller come are left in small hills designed to receive the tobacco plant. This mode of distributing fertilizer throughout the length of the furrow is found to possess advantages over the old way of depositing the same only at the roots of the plants or in the hills, and by my invention I am enabled to accomplish such advantageous distribution.

If desired, the recesses or pockets 18 may have a metal facing 19, the edges of which extend beyond the recesses forming flanges 20. Securing-flanges 21 are located at the outer sides of the flanges 20, by which the plates may be secured to the roller.

Having described my invention, what I claim is—

1. In a machine of the class described, the combination with the framework, the front furrow-opening and the rear opposite furrow-closing shovels, of the hopper supported above and in rear of the shovel at the front of the machine, a tube depending from the hopper and terminating in rear of said shovel, ways below the bottom of the hopper, a perforated slide mounted in the ways, an opening formed in the front of the hopper, a sliding gage mounted therein and adapted to regulate the size of the opening in the hopper, the transverse axle, the notched roller, the pinion on the axle, the stub-shaft above the same, the pinion on the stub-shaft, and the pitman connected to the pinion and at its front end to the perforated slide, substantially as specified.

2. In a machine of the class described, the combination with a frame, an axle therein, planting devices located in front of the axle, means for operating the planting devices, of a roller mounted on the axle and provided with transverse recesses, metal plates conforming to, secured within, and extending beyond the edges of the recesses, and securing flanges located at the outer sides of the plates and secured to the periphery of the roller, substantially as specified.

In testimony that I claim the foregoing as my own I have hereto affixed my signature in the presence of two witnesses.

JOHN J. MALONE.

Witnesses:
R. G. PARRY,
C. H. PARRY.